United States Patent Office 3,122,504
Patented Feb. 25, 1964

3,122,504
CONDENSATION PRODUCTS OF POLYALKYLENE-POLYAMINES AND ESTERS OF HIGH MOLECULAR CARBOXYLIC ACIDS
Hans Wedell, Dusseldorf-Holthausen, Germany, assignor to Bohme Fettchemie G.m.b.H., Dusseldorf, Germany, a corporation of Germany
No Drawing. Filed Feb. 27, 1961, Ser. No. 91,668
9 Claims. (Cl. 252—8.75)

The present invention relates to condensation products formed by a condensation reaction between polyalkylene-polyamines or alkylene diamines and esters of high molecular weight carboxylic acids and to a method of producing such condensation products.

The present application is a continuation-in-part application of application Serial No. 653,293, filed April 17, 1957, now abandoned.

I have found that useful condensation products which may be employed as textile auxiliary agents may be obtained by subjecting a polyalkylene-polyamine or alkylene diamine to a condensation reaction with esters of high molecular weight carboxylic acids at temperatures below 100° C., for a short period of time and then weakly acidifying the reaction mixture with a low molecular weight carboxylic acid, preferably a lower alkyl monocarboxylic acid.

The present process is distinguished from these known processes in which polyalkylene-polyamines are reacted with derivatives of high molecular weight fatty acids, in that low condensation temperatures and relatively short reaction periods are used. The low condensation temperature and the short condensation period control the condensation reaction in such a way that the final condensation product is primarily a mixture of unreacted esters of high molecular weight fatty acids and mono-amides formed by the high molecular weight fatty acids and the polyalkylene-polyamides or alkylene diamines, or if glycerides of the high molecular weight fatty acids are used as the carboxylic acid ester condensation component, the condensation reaction product consists of a mixture of glycerine mono- and di-esters including small portions of unreacted glycerides, and monoamides formed by the high molecular weight fatty acids and the polyalkylene-polyamines or alkylene diamines.

The free amino groups in the terminal position on the mono-amide molecules are neutralized by the addition of the low molecular weight carboxylic acid to the condensation reaction mixture. The condensation products obtained in accordance with the present invention are stable and do not discolor, in contrast to the products produced in accordance with the known processes.

It is an object of the invention to provide novel condensation products which are useful textile auxiliary agents which do not discolor the textile materials.

It is another object of the invention to provide a novel process for the preparation of polyamine-high molecular weight carboxylic acid esters condensation products.

These and other objects and advantages of the invention will become obvious from the following detailed description.

The method of producing partially amidified condensation products according to the invention comprises reacting an amine selected from the group consisting of lower alkylene diamines and poly lower alkylene polyamines having from 3 to 4 nitrogen atoms with a low-molecular weight aliphatic alcohol ester of a high molecular weight fatty acid, 0.67 to 1.45 mols of said fatty acid ester groups being present per molecular equivalent of nitrogen atom in said amine, at a temperature of from 60° C. to 100° C. for 10 to 30 minutes, and then acidifying the condensation reaction product with a low molecular weight alkyl carboxylic acid to a neutral to slightly acid end point.

Examples of suitable polyalkylene-polyamines or alkylene diamines which may be used as one of the starting materials for the condensation reaction in accordance with the present invention are the following: ethylene-diamine, hexamethylenediamine, diethylenetriamine, triethylene tetramine, and higher polyethylene-polyamines, as well as their substitution products and derivatives. It is not necessary that these polyethylene-polyamines or alkylene diamines be present in the reaction mixture in absolutely pure form; technical grade polyamines may be used with equally satisfactory results.

Examples of esters of high molecular weight alkyl carboxylic acids which may be employed for the production of the condensation products in accordance with the present invention are the following: naturally-occurring fatty and wax products containing as principal constituents glycerides of higher alkyl carboxylic acids such as coconut oil, palm oil, tallow (Bayberry wax), castor oil, peanut oil, linseed oil, tung oil, sperm oil, fish oils, and similar fats, oils or waxes of plant or animal origin, as well as mixtures of the same. Similarly, partially or completely hydrogenated derivatives of these fatty substances may be used in the present condensation reaction. Equally useful are the esters of the high molecular weight carboxylic acids formed with other alcohols than glycerine, especially with aliphatic alcohols, such as alkanols having from 1 to 20 carbon atoms.

Most advantageously the condensation products, according to the present invention, are produced by heating the high molecular weight carboxylic acid ester to temperatures between 60 and 70° C. and adding the polyalkylene-polyamine or alkylene diamine reaction condensation component to and admixing the same with the hot carboxylic acid ester. The reaction released thereby is somewhat exothermic, so that in most cases the condensation reaction mixture must be slightly cooled exteriorly to maintain the temperature of the reaction mixture at the desired temperature below 100° C. After the condensation reaction components have been thoroughly admixed with each other, the reaction mixture is stirred for about 15 to 30 minutes. Subsequently, the condensation reaction is interrupted by weakly acidifying the condensation reaction mixture with a low molecular weight organic carboxylic acid such as the alkanoic acids, formic acid, acetic acid, and the like.

The condensation between the high molecular weight alkyl carboxylic acid esters and the polyalkylene-polyamines or alkylene diamines is advantageously carried out by providing the reaction components in a molar ratio such that between 0.67 and 1.45 mols of acid radicals in esterified form are present for each nitrogen atom in the polyamine reaction components. However, the condensation components may be present in different quantitative ratios, and condensation products which are useful as textile auxiliary agents and for other purposes are still obtained.

For best results I have further found that it is advantageous to add a small amount of an emulsifying agent to the condensation reaction mixture or to the individual starting components. Examples of emulsifying agents suitable for this purpose are alkyl sulphates, alkyl sulphonates, quaternary onium compounds, ethyleneoxide addition products, and polyhydroxy alcohols such as glycerine or sorbitol. These emulsifying agents may be added to the starting compounds or to the reaction mixture individually or in combination with each other in the form of mixtures.

The condensation products obtained by the condensation reaction in accordance with the present invention are soluble in water or well dispersible in water. In order to increase the water solubility of the condensation products, they may be subjected to an addition reaction with ethylene-oxide to add one or more mols of ethyleneoxide to the molecule prior to the addition of the low molecular weight organic carboxylic acid to the condensation reaction mixture.

The condensation products produced in accordance with the present invention are useful as textile auxiliary agents, especially as brightening or scrooping agents or as preliminary treatment agents for textile materials of all types, but especially for textiles made of cotton, regenerated cellulose, artificial silk (rayon) or fully synthetic fibers (nylon, Dacron, Orlon, Perlon, etc.) in the form of fibers, flakes, threads, ribbons, woven fabrics, knitted fabrics and finished goods, and do not discolor the said materials as do the prior art compositions.

In addition, the condensation products of the present invention impart antistatic properties to the textile materials treated therewith.

For the treatment of textiles the condensation products according to the present invention are used in the form of aqueous solutions or dispersions which contain from 0.5 to 15 gm. or more of condensation product per liter. The concentration of the condensation product in the soluton or dispersion depends upon the particular type of textile material to be treated and the method of treatment. If necessary, well known emulsifying and dispersing agents may be used simultaneously with the solutions or dispersions of the condensation products above described; similarly, other brightening or scrooping agents, lubricating agents and other textile auxiliary agents which facilitate the treatment and impart additional effects to the textile material may be used concurrently with the condensation products produced in accordance with the invention.

The following examples will further illustrate the present invention and enable others skilled in the art to understand the invention more completely. It will be understood, however, that the invention is not limited to these particular examples.

EXAMPLE I 200 gm. of hardened caster oil were heated to 75° C. and at that temperature admixed with 30 gm. of ethylenediamine. There were 0.67 mol of the acid ester groups per nitrogen atom in the polyamine. The resulting mixture was stirred for 10 minutes at 75° C. and then stirred into 760 cc. of a 3% acetic acid solution, after adding an emulsifying agent (10 gm. of the addition product formed by 5 mols ethyleneoxide and 1 mol stearic acid). A white paste was obtained.

Perlon lingerie material was impregnated with an aqueous solution which contained 3 gm. of the above-described condensation product per liter. The wet fabric was centrifuged until the residual moisture content was 40% and thereafter dried at 60° C. In addition to a smooth, pliable feel, the fabric exhibited antistatic properties.

EXAMPLE II 100 gm. of peanut oil were stirred for 15 minutes at 70° C. with 15 gm. of technical grade triethylenetetramine. There were 0.83 mol of the acid ester groups per nitrogen atom in the polyamine. This reaction mixture was then stirred with 30 gm. of glycerine, 15 gm. of acetic acid and 240 cc. of water into a soft paste. Textile materials impregnated with an aqueous dispersion containing about 0.5% of this paste and thereafter dried, had a soft, pliable feel.

EXAMPLE III 400 gm. of beef tallow were stirred for 15 minutes at 80° C. with 60 gm. of technical-grade diethylenetriamine. There were 0.78 mol of acid ester groups per nitrogen atom in the polyamine. Thereafter, ethylene oxide was introduced into the reaction mixture at 100° C. until the reaction mixture showed an increase in weight of 30 gm. Subsequently, the mixture was neutralized with a 5% solution of acetic acid.

A regenerated cellulose fabric was impregnated with a solution which contained 2 gm. of the above condensation product. After the customary centrifuging and drying, the fabric had a beautifully soft feel.

EXAMPLE IV 200 gm. of tallow fatty acid ethyl ester and 15 gm. of technical-grade diethylenetriamine were heated for 10 minutes at 80° C. There were 1.45 mols of acid ester per nitrogen atom in the polyamine. Thereafter 10 gm. of the sodium salt of an acid fatty alcohol sulfuric acid ester ($C_{12}$ to $C_{16}$) was added and the reaction mixture was neutralized with dilute acetic acid and stirred. A soft paste was obtained which was readily dispersible in water. Textile fabrics impregnated with an aqueous dispersion containing about 0.2% of this paste were imparted with a soft, pleasant feel.

EXAMPLE V 500 gm. of beef tallow were stirred with 30 gm. of diethylenetriamine and 50 gm. of hexamethylenediamine for 10 minutes at 80° C. in the presence of 40 gm. of the addition product formed by 5 mols of ethyleneoxide and 1 mol of stearic acid. There were 0.98 mol of acid ester groups per nitrogen atom in the polyamine. Thereafter, 75 gm. of glycerine were added to the mixture and it was neutralized with a 5% solution of acetic acid. An excellent brightening or scrooping agent was obtained thereby, which simultaneously imparted antistatic properties to fabrics impregnated therewith.

EXAMPLE VI 100 gm. of coconut oil were heated at 80° C. with 5 gm. of the addition product of 1 mol of hexadecyl alcohol and 5 mols of ethylene oxide, and the mixture was stirred at that temperature with 15 gm. of technical-grade diethylenetriamine for 15 minutes. There were 0.78 mol of acid ester groups per nitrogen atom in the polyamine. Subsequently, 18 gm. of glacial acetic acid were added to neutralization, and finally 162 cc. of hot water at 80° C. were added. The paste thus obtained was used for impregnating ribbons of copper silk, whereby the copper silk was imparted with a soft, pleasant feel.

EXAMPLE VII

In order to demonstrate the advantages of the instant products over prior art products, the following comparative tests were made.

*Sample A*

A product was prepared according to the teachings of Example I of U.S. Patent 2,243,980, issued June 3, 1941. 300 grams of a hardened train oil were heated for 2 to 3 hours at 190° C. while stirring with 57 grams of diethylenetriamine having a 5% water content. There were 0.61 mol of acid ester per nitrogen atom in the polyamine. The water in the amine was distilled off during the heating and a yellowish wax-like base was obtained. The base was melted at 90° C. and 5% acetic acid at 90° C. was added to the base in a ratio of 4 parts of acetic acid per part of molten base. A paste, easily soluble in water, was obtained.

*Sample B*

A product was prepared according to the teachings of Example II of British Patent 657,419, published September 19, 1951. 587 parts of coconut oil and 277 parts of diethylene triamine were heated in an open kettle at 150° C. while stirring for 8 hours. There were 0.25 mol of acid ester per nitrogen atom in the polyamine. The mixture was cooled to just above the melting point of the reaction product (50° C.). Then 136 parts of acetic anhydride were mixed with the molten mass with stirring at 135° C. for 5 hours and then at 150° C. for 3 hours. The product was melted and mixed with 5400 parts of a 3% acetic acid solution until a homogeneous mixture was found. A water-soluble product was recovered.

*Sample C*

A product was prepared according to the teachings of the present invention as follows: 300 gm. of hardened fish oil were stirred for 20 minutes at 80° C. with 30 gm. of diethylenetriamine. There were 1.17 mols of acid ester per nitrogen atom in the polyamine. 40 gm. of acetic acid was then stirred into the reaction mixture and immediately upon addition of the acetic acid, the reaction mixture was poured into 740 cc. of water previously heated to 60° C. The resulting emulsion was stirred continuously while it was allowed to cool to room temperature.

The same hardened fish oil was used in Samples A and C and the same diethylene triamine was used in all three samples.

Samples A and B each had a distinct yellow coloration while Sample C was colorless.

Three swatches of spun rayon grey cloth were separately impregnated with an aqueous solution containing 1% of one of the Samples A, B or C. The wet cloths were centrifuged until the residual moisture content was 40% and thereafter dried at 60° C. A control untreated swatch was compared with the three sample swatches. The swatches treated with Samples A and B had a distinct yellowish cast while the swatch treated with Sample C did not have a yellowish cast.

Examination showed that the softening effect of Samples A and C were good, but Sample B was not as good. Therefore, the products of the present invention are as good or better softening agents than the prior art products and have the additional advantage of not yellowing the treated fabric as the prior art products do.

While the present invention has been illustrated with the aid of certain specific embodiments thereof, it will be readily apparent to those skilled in the art that the invention is not limited to these specific embodiments and that various changes and modifications may be made without departing from the spirit of the invention or the scope of the appended claims.

I claim:

1. A process of producing partially amidified condensation products comprising reacting an amine selected from the group consisting of lower alkylene diamines having 2 to 6 carbon atoms and poly-ethylene polyamines having 3 to 4 nitrogen atoms and 4 to 6 carbon atoms with an ester of a higher fatty acid having 8 to 22 carbon atoms whose alcohol portion is selected from the group consisting of glycerine and alkanols having 1 to 20 carbon atoms at a temperature from 60° C. to 100° C. for 10 to 30 minutes, 0.67 to 1.45 mols of said fatty acid ester groups being present per molecular equivalent of nitrogen atoms in said amine, and then acidifying the condensation reaction product with a lower alkanoic acid to a neutral to slightly acid end point.

2. The process of claim 1 wherein the condensation and acidification steps are carried out in the presence of an organic emulsifying agent.

3. The process of claim 1 wherein an organic emulsifying agent is added after the condensation step.

4. A process of producing partially amidified condensation products comprising reacting an amine selected from the group consisting of lower alkylene diamines having 2 to 6 carbon atoms and poly-ethylene polyamines having from 3 to 4 nitrogen atoms and 4 to 6 carbon atoms with a glyceride of a higher fatty acid having 8 to 22 carbon atoms at a temperature of 60° C. to 100° C. for 10 to 30 minutes, 0.67 to 1.45 mols of said fatty acid groups being present per molecular equivalent of nitrogen atoms in said amine, adding an emulsifying agent selected from the group consisting of higher fatty alcohol sulfates, low molecular weight aliphatic saturated hydrocarbon polyhydroxy alcohols, higher fatty alcohol sulfonates, lower alkylene oxide addition products of higher fatty acids, lower alkylene oxide addition products of higher fatty alcohols, and then acidifying the condensation reaction product with a lower alkanoic acid to a neutral to slightly acid end point.

5. A process of producing partially amidified condensation products comprising reacting an amine selected from the group consisting of lower alkylene diamines having 2 to 6 carbon atoms and polyethylene polyamines having 3 to 4 nitrogen atoms and 4 to 6 carbon atoms with a glyceride of a higher fatty acid having 8 to 22 carbon atoms, 0.67 to 1.45 mols of said fatty acid groups being present per molecular equivalent of nitrogen atoms in said amine, at a temperature of 60° C. to 100° C. for 10 to 30 minutes in the presence of an emulsifying agent selected from the group consisting of higher fatty alcohol sulfates, low molecular weight aliphatic saturated hydrocarbon polyhydroxy alcohols, higher fatty alcohol sulfonates, lower alkylene oxide addition products of higher fatty acids, lower alkylene oxide addition products of higher fatty alcohols, and then acidifying the condensation reaction product with a lower alkanoic acid to a neutral to slightly acid end point.

6. A process of producing partially amidified condensation products comprising reacting an amine selected from the group consisting of lower alkylene diamines having 2 to 6 carbon atoms and polyethylene polyamines having 3 to 4 nitrogen atoms and 4 to 6 carbon atoms with a glyceride of a higher fatty acid having 8 to 22 carbon atoms at a temperature of 60° C. to 100° C. for 10 to 30 minutes, 0.67 to 1.45 mols of said fatty acid groups being present per molecular equivalent of nitrogen atoms in said amine, oxyalkylating the said condensation product with sufficient ethylene oxide to render the said product water dispersible, and then acidifying the condensation reaction product with a lower alkanoic acid to a neutral to slightly acid end point.

7. The process of claim 6 wherein the said fatty acid glyceride is beef tallow.

8. The process of claim 6 wherein the said amine is diethylenetriamine.

9. Partially amidified condensation products produced by reacting an amine selected from the group consisting of lower alkylene diamines having 2 to 6 carbon atoms and polyethylene polyamines having 3 to 4 nitrogen atoms and 4 to 6 carbon atoms with an ester of a higher fatty acid having 8 to 22 carbon atoms whose alcohol portion is selected from the group consisting of glycerine and alkanols having 1 to 20 carbon atoms at a temperature of 60° C. to 100° C. for 10 to 30 minutes, 0.67 to 1.45 mols of said fatty acid ester groups being present per molecular equivalent of nitrogen atoms in said amine and then acidifying the condensation reaction product with a lower alkanoic acid to a neutral to slightly acid end point.

References Cited in the file of this patent

UNITED STATES PATENTS

| | | |
|---|---|---|
| 1,924,698 | Neelmeier et al. | Aug. 29, 1933 |
| 2,243,980 | Rheiner et al. | June 3, 1941 |
| 2,425,393 | Robinson et al. | Aug. 12, 1947 |

FOREIGN PATENTS

| | | |
|---|---|---|
| 657,419 | Great Britain | Sept. 19, 1951 |